United States Patent
Zhou et al.

(10) Patent No.: US 12,166,726 B2
(45) Date of Patent: Dec. 10, 2024

(54) COMMAND PROCESSING METHOD AND TERMINAL DEVICE

(71) Applicant: VIVO MOBILE COMMUNICATION CO., LTD., Guangdong (CN)

(72) Inventors: Jianping Zhou, Dongguan (CN); Xiaodong Yang, Donogguan (CN); Li Chen, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 695 days.

(21) Appl. No.: 17/128,815

(22) Filed: Dec. 21, 2020

(65) Prior Publication Data

US 2021/0111856 A1 Apr. 15, 2021

Related U.S. Application Data

(63) Continuation-in-part of application No. PCT/CN2019/089384, filed on May 30, 2019.

(30) Foreign Application Priority Data

Jun. 22, 2018 (CN) .......................... 201810654978.8

(51) Int. Cl.
*H04L 5/00* (2006.01)
*H04W 72/04* (2023.01)
*H04W 74/0833* (2024.01)

(52) U.S. Cl.
CPC ........... *H04L 5/0098* (2013.01); *H04W 72/04* (2013.01); *H04W 74/0833* (2013.01)

(58) Field of Classification Search
None
See application file for complete search history.

(56) References Cited

U.S. PATENT DOCUMENTS 9,131,468 B2 9/2015 Lee
2012/0294213 A1 11/2012 Chen et al.
(Continued)

FOREIGN PATENT DOCUMENTS

CN 102088433 A 6/2011
CN 102271415 A 12/2011
(Continued)

OTHER PUBLICATIONS

Nokia, "Further details on BWP switch interaction with RA," 3GPP TSG-RAN WG2 NR ad hoc 1801, Agenda Item 10.3.1.4., R2-1800961, Vancouver, Canada, Jan. 22-26, 2018, pp. 1-5 (Year: 2018).*
Supplementary European Search Report regarding International Application No. 19823275.3-1215/3799498—PCT/CN2019/089384, dated Jul. 14, 2021.
(Continued)

*Primary Examiner* — Benjamin Lamont
(74) *Attorney, Agent, or Firm* — Harness, Dickey & Pierce, P.L.C.

(57) ABSTRACT

A command processing method is used to solve a problem that the terminal device cannot process a BWP switching command, a BWP activation command or a BWP deactivation command that is received in a case where there are a plurality of BWPs simultaneously activated for the terminal device, and there is ongoing random access on one or more BWPs in the activated plurality of BWPs. The method includes: receiving a first command in a case where there is at least one configured or activated BWP for the terminal device, and there is ongoing random access on at least one BWP in the at least one configured or activated BWP, the first command including at least one of the BWP switching command, the BWP activation command or the BWP deactivation command; and processing the first command according to a preset processing manner.

18 Claims, 2 Drawing Sheets

In the case where there is at least one configured or activated BWP for the terminal device, and there is an ongoing random access on at least one BWP in at least one configured or activated BWP, a first command is received — S11

The terminal device processes the first command according to a preset processing manner — S12

(56) References Cited

U.S. PATENT DOCUMENTS

| | | | |
|---|---|---|---|
| 2018/0124687 A1 | 5/2018 | Park et al. | |
| 2018/0234896 A1 | 8/2018 | Liu et al. | |
| 2018/0288746 A1* | 10/2018 | Zhang | H04L 1/0031 |
| 2019/0044689 A1* | 2/2019 | Yiu | H04W 72/23 |
| 2019/0132862 A1* | 5/2019 | Jeon | H04L 5/0098 |
| 2019/0149421 A1* | 5/2019 | Jin | H04L 5/0078 |
| | | | 370/331 |
| 2020/0337051 A1* | 10/2020 | Chang | H04W 74/0833 |
| 2020/0351946 A1* | 11/2020 | Pang | H04W 72/0453 |
| 2020/0389282 A1* | 12/2020 | Turtinen | H04W 74/02 |
| 2020/0403763 A1* | 12/2020 | Takeda | H04L 5/001 |
| 2021/0099998 A1* | 4/2021 | Babaei | H04L 5/0098 |
| 2021/0251017 A1* | 8/2021 | Chen | H04W 74/0833 |

FOREIGN PATENT DOCUMENTS

| | | |
|---|---|---|
| CN | 108093481 A | 5/2018 |
| EP | 3720214 A1 | 10/2020 |
| WO | WO-2012164531 A1 | 12/2012 |
| WO | WO-2012164534 A1 | 12/2012 |
| WO | WO-2017063479 A1 | 4/2017 |

OTHER PUBLICATIONS

"Correction to switching of bandwidth part and random access," Ericsson, 3GPP TSG-RAN WG2 Meeting #102, R2-1807272, dated May 25, 2018.

"Control Plane Impacts for Bandwidth Parts," Huawei, HiSilicon, 3GPP TSG-RAN WG2 Meeting #99bis, Prague, Czech Republic, Oct. 9-13, 2017.

"Discussion on the RAN2 impacts with the BWP terminologies introduced in RAN 1," ZTE Corporation, Sanechips, 3GPP TSG-RAN WG2 Meeting #100, Reno, USA, Nov. 27-Dec. 1, 2017.

"Miscellaneous Corrections," 3GPP TSG-RAN WG2 NR Ad hoc 1801, Vancouver, Canada, Jan. 22-26, 2018.

International Search Report and Written Opinion regarding International Patent Application No. PCT/CN2019/089384, dated Aug. 30, 2019. Translation provided by Bohui Intellectual Property.

First Office Action regarding Chinese Patent Application No. 201810654978.8, dated May 7, 2020. Translation provided by Bohui Intellectual Property.

Notification to Grant Patent Right for Invention regarding Chinese Patent Application No. 201810654978.8, dated Aug. 4, 2020. Translation provided by Bohui Intellectual Property.

* cited by examiner

COMMAND PROCESSING METHOD AND TERMINAL DEVICE

CROSS-REFERENCE TO RELATED APPLICATIONS

This application is a Bypass Continuation-in-Part Application of PCT/CN2019/089384 filed May 30, 2019, which claims priority to Chinese Patent Application No. 201810654978.8, filed Jun. 22, 2018, titled "COMMAND PROCESSING METHOD AND TERMINAL DEVICE", which are incorporated herein by reference in their entirety.

TECHNICAL FIELD

This present disclosure relates to the technical field of communication, and more particularly to a BWP switching command processing method and a terminal device.

BACKGROUND

In the fifth generation (5G) communication system, a cell supports a system bandwidth up to 400 MHZ, which is much greater than a maximum system bandwidth of 20 MHz supported by a long term evolution (LTE) system, so as to support a larger system and greater user throughput.

SUMMARY

In a first aspect, some embodiments of the present disclosure provide a BWP switching command processing method performed by a terminal device. The BWP switching command processing method includes:
receiving a first command in a case where there is at least one configured or activated bandwidth part (BWP) for the terminal device, and there is ongoing random access on at least one BWP in the at least one configured or activated BWP, the first command including at least one of a BWP switching command, a BWP activation command or a BWP deactivation command, the BWP switching command being used to instruct the terminal device to deactivate a first BWP and activate a second BWP, the BWP activation command being used to instruct the terminal device to activate a fifth BWP, the BWP deactivation command being used to instruct the terminal device to deactivate a sixth BWP, the first BWP and the sixth BWP being BWPs in the at least one configured or activated BWP, and the second BWP and the fifth BWP being BWPs except the at least one configured or activated BWP; and processing the first command according to a preset processing manner.

In a second aspect, some embodiments of the present disclosure provide a terminal device. The terminal device includes:
a radio frequency unit is configured to receive a first command in a case where there is at least one configured or activated BWP for the terminal device, and there is ongoing random access on at least one BWP in the at least one configured or activated BWP, the first command including at least one of a BWP switching command, a BWP activation command or a BWP deactivation command, the BWP switching command being used to instruct the terminal device to deactivate a first BWP and activate a second BWP, the BWP activation command being used to instruct the terminal device to activate a fifth BWP, the BWP deactivation command being used to instruct the terminal device to deactivate a fourth BWP, the first BWP and the sixth BWP being BWPs in the at least one configured or activated BWP, and the second BWP and the fifth BWP being BWPs except the at least one configured or activated BWP; and
a processor is configured to process the first command received by the radio frequency unit according to a preset processing manner.

In a third aspect, some embodiments of the present disclosure provide a non-transitory computer-readable storage medium. The non-transitory computer-readable storage medium stores computer programs that, when executed by a processor, cause the processor to perform steps of the BWP switching command processing method according to the first aspect.

DETAILED DESCRIPTION

Figure 1:
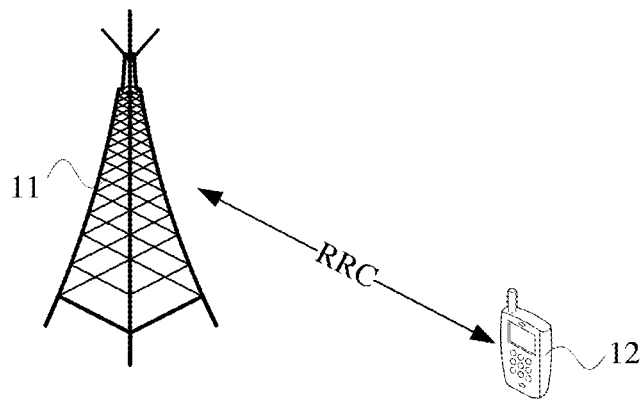
FIG. 1 is a schematic diagram showing a structure of a communication system, in accordance with some embodiments of the present disclosure.

The technical solutions in the embodiments of the present disclosure will be described clearly and completely with reference to accompanying drawings in the embodiments of the present disclosure. Obviously, the described embodiments are merely some but not all embodiments of the present disclosure. All other embodiments obtained on the basis of the embodiments of the present disclosure by a person of ordinary skill in the art without paying any creative effort shall be included in the protection scope of the application.

The term "and/or" herein is merely used to describe an association relationship of associated objects, which represents three kinds of relationships. For example, the phrase "A and/or B" represents three conditions: A exists alone, both A and B exist, and B exists alone. In addition, the character "/" herein generally indicates that the associated objects are in an "or" relationship. The character "/" in a formula indicates that the associated objects are in a "division" relationship. The term "plurality" herein means two or more unless otherwise specified.

In order to clearly describe the technical solutions in the embodiments of the present disclosure, in the embodiments of the present disclosure, the terms such as "first" and "second" are used to distinguish the same or similar items whose functions and effects are substantially the same. A person skilled in the art can understand that the terms such as "first" and "second" are not intended to limit a quantity and an execution order of the items.

In the embodiments of the present disclosure, the words such as "for example" or "such as" are used to indicate examples, illustrations or explanations. Any embodiment or design solution described as "for example" or "such as" in the embodiments of the present disclosure should not be construed as being more preferable or advantageous than other embodiments or design solutions. To be precise, use of the words such as "for example" or "such as" is intended to present related concepts in a specific manner.

Since the system bandwidth of the 5G is large, if a terminal device supports an entire system bandwidth of the 5G system, a cost of the terminal device will be greatly increased. In order to support access of a narrowband terminal device or a terminal device in an energy-saving mode, the 5G system supports a dynamic and flexible bandwidth allocation, and the system bandwidth may be divided into a plurality of bandwidth parts (BWPs). Moreover, configuring different numerologies for different bandwidths is further supported in the cell of the 5G system, and if the terminal device does not support all numerology types of the cell, BWPs with corresponding frequency bands may be prevented from being configured to the terminal device when BWPs are configured for the terminal device, thereby supporting the access of the narrowband terminal device or the terminal device in the energy-saving mode. A network side device configures a BWP set available to each cell for the terminal device through radio resource control (RRC) signaling, and dynamically switches a BWP that needs to be activated through L1 signaling, i.e., activating one BWP while deactivating another BWP. With a development of communication technologies, a scenario where one or more BWPs of the terminal device are simultaneously activated arises. If there are one or more BWPs simultaneously activated, and there is ongoing random access on BWP(s) in the activated one or more BWPs, how the terminal device processes a received BWP switching command, a received BWP activation command and a received BWP deactivation command is an urgent problem to be solved.

With a development of communication technologies, a scenario where one or more BWPs of the terminal device are simultaneously activated arises. If there are one or more BWPs simultaneously activated, and there is ongoing random access on BWP(s) in the activated one or more BWPs, how the terminal device processes a received BWP switching command, a received BWP activation command and a received BWP deactivation command is an urgent problem to be solved.

On the basis of the above problem, some embodiments of the present disclosure provide a BWP switching command processing method and a terminal device. In the BWP switching command processing method, in a case where there is at least one configured or activated BWP for the terminal device, and there is ongoing random access on at least one BWP in the at least one configured or activated BWP, at least one of the BWP switching command, the BWP activation command or the BWP deactivation command is received, and then the received at least one of the BWP switching command, the BWP activation command or the BWP deactivation command is processed according to a preset processing manner. Since some embodiments of the present disclosure provide a manner of processing the received at least one of the BWP switching command, the BWP activation command or the BWP deactivation command in the case where there is at least one configured or activated BWP for the terminal device, and there is ongoing random access on the at least one BWP in the at least one configured or activated BWP, in some embodiments of the present disclosure, the received at least one of the BWP switching command, the BWP activation command or the BWP deactivation command may be processed in the case where there are one or more BWPs simultaneously activated for the terminal device, and there is the ongoing random access on the BWP(s) in the activated one or more BWPs.

The technical solution provided by the application may be applied to various communication systems, such as a fifth generation (5G) communication system, a future evolution system or various unified communication systems. A plurality of application scenarios may be included, such as machine to machine (M2M), D2M, macro and micro communications, enhance mobile broadband (eMBB), ultra-reliable and low-latency communication (URLLC), and massive machine type communication (mMTC). These scenarios include, but are not limited to scenarios such as communication between a terminal device and a terminal device, or communication between a network side device and a network side device, or communication between a network side device and a terminal device. The embodiments of the present disclosure may be applied to communication between a network side device and a terminal device, or communication between a terminal device and a terminal device, or communication between a network side device and a network side device in the 5G communication system.

FIG. 1 shows a schematic diagram of a possible structure of a communication system that embodiments of the present disclosure relates to. As shown in FIG. 1, the communication system may include a network side device 11 (FIG. 1 showing an example in which the network side device is a base station), and a terminal device 12 (FIG. 1 showing an example in which the terminal device is a mobile phone). The terminal device 12 may communicate with the network side device 11 via a radio access network (RAN), and there is at least one configured or activated BWP for the terminal device 12. The network side device 11 generates at least one carrier wave, and each carrier wave corresponds to a cell.

The network side device 11 may be a base station, a device in a core network, a transmission and reception point (TRP), a relay station, an access point, etc. The network side device 11 may be a base transceiver station (BTS) in a global system for mobile communication (GSM) or a code division multiple access (CDMA) network, or may be a NodeB (NB) in wideband code division multiple access (WCDMA), or may be an evolutional NodeB (eNB or eNodeB) in long term evolution (LTE). The network side device 11 may also be a wireless controller in a cloud radio access network (C-RAN) scenario. The network side device 11 may also be a network side device in the 5G communication system or a network side device in a future evolution network.

The terminal device 12 may be a mobile terminal or a non-mobile terminal. The mobile terminal may be a device that provides voice and/or other service data connectivity to a user, a handheld device with a wireless communication function, a computing device, or other processing devices connected to a wireless modem, a vehicle-mounted device, a wearable device, a terminal device in a future 5G network or a terminal device in a future evolved public land mobile network (PLMN). The mobile terminal may communicate with one or more core networks via the RAN. For example, the mobile terminal may be a mobile phone (or referred to as a "cellular" phone) or a computer with a mobile terminal. For example, the mobile terminal may be a portable, pocket-sized, handheld, built-in computer or vehicle-mounted mobile device, which exchanges language and/or data with the RAN, as well as a personal communication service (PCS) phone, a cordless phone, a session initiation protocol (SIP) phone, a wireless local loop (WLL) station, a personal digital assistants (PDA) or other device. A wireless terminal may also be a mobile device, a user equipment (UE), an access terminal, a wireless communication device, a terminal unit, a terminal station, a mobile station, a mobile, a remote station, a distant station, a remote terminal, a subscriber unit, a subscriber station, a user agent, or a terminal device. As an example, in the embodiments of the present disclosure, FIG. 1 shows an example in which the terminal device is a mobile phone.

An execution subject of the BWP switching command processing method provided by some embodiments of the present disclosure may be the above terminal device (including the mobile terminal and the non-mobile terminal), or may be a functional module and/or a functional entity in the terminal device that can perform the BWP switching command processing method, which may be specifically determined according to actual use requirements, and is not limited in the embodiments of the present disclosure.

Figure 2:
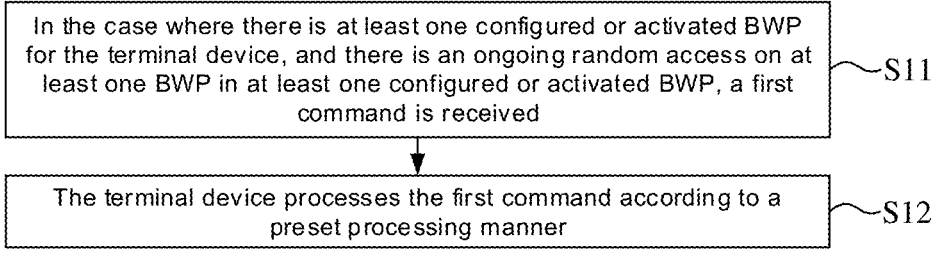
FIG. 2 is a flow diagram showing steps of a BWP switching command processing method, in accordance with some embodiments of the present disclosure.

Some embodiments of the present disclosure provide a BWP switching command processing method. Referring to FIG. 2, the BWP switching command processing method includes S11 and S12.

In S11, in the case where there is at least one configured or activated BWP for the terminal device, and there is an ongoing random access on at least one BWP in at least one configured or activated BWP, a first command is received.

The first command includes at least one of a BWP switching command, a BWP activation command, or a BWP deactivation command. The BWP switching command is used to instruct the terminal device to deactivate a first BWP and activate a second BWP, the BWP activation command is used to instruct the terminal device to activate a fifth BWP, and the BWP deactivation command is used to instruct the terminal device to deactivate a sixth BWP. The first BWP and the sixth BWP are BWPs in the at least one configured or activated BWP, and the second BWP and the fifth BWP are BWPs except the at least one configured or activated BWP.

In S12, the terminal device processes the first command according to a preset processing manner.

In some examples, the preset processing manner is specified by a communication protocol, or is configured by the network side device for the terminal device, or is customized by the terminal device.

That is, the preset processing manner may be specified by the communication protocol, or may be configured by the network side device for the terminal device, or may be customized by the terminal device.

In a case where the preset processing manner is specified by the communication protocol, in the case where there is at least one configured or activated BWP for the terminal device, and there is the ongoing random access on the at least one BWP in the at least one configured or activated BWP, the processing manner of the BWP switching command received by the terminal device is given by the communication protocol.

In a case where the preset processing manner is configured by the network side device for the terminal device, in the case where there is at least one configured or activated BWP for the terminal device, and there is the ongoing random access on the at least one BWP in the at least one configured or activated BWP, the processing manner of the BWP switching command received by the terminal device is configured by the network side device for the terminal device.

In a case the preset processing manner is customized by the terminal device, in the case where there is at least one configured or activated BWP for the terminal device, and there is the ongoing random access on the at least one BWP in the at least one configured or activated BWP, the processing manner of the BWP switching command received by the terminal device is determined by the terminal device.

Implementation of S12 in the above embodiment will be described in detail below by taking examples in which the first command is the BWP switching command, the BWP activation command, and the BWP deactivation command.

It will be noted that, although in the following embodiments, some embodiments of the present disclosure is described only by taking the examples in which the first command includes the BWP switching command, the first command includes the BWP activation command, and the first command includes the BWP deactivation command, but some embodiments of the present disclosure are not limited thereto. The first command in some embodiments of the present disclosure may also include two or three of the BWP switching command, the BWP activation command, and the BWP deactivation command. For example, activated BWPs of the terminal device are BWP1, BWP2, BWP3 and BWP4. Then, the first command may include a BWP switching command for instructing the terminal device to deactivate BWP1 and activate BWP5, a BWP deactivation command for instructing the terminal device to deactivate BWP2 and BWP3, and a BWP activation command for instructing the terminal device to activate BWP6 and BWP7.

In a case where the first command includes two or three of the BWP switching command, the BWP activation command, and the BWP deactivation command, the following manners of processing the BWP switching command, the BWP activation command and the BWP deactivation command in the first command are performed. For example, the first command includes the BWP switching command and the BWP activation command. Then, the processing manner of the BWP switching command is the same as the following processing manner of the BWP switching command, and the processing manner of the BWP activation command is the same as the following processing manner of the BWP activation command.

I. The first command includes the BWP switching command, and the BWP switching command is used to instruct the terminal device to deactivate the first BWP and activate the second BWP.

In a case where the first command includes the BWP switching command, the S12, in which the first command is processed according to the preset processing manner, includes the following cases.

In case 1, the first BWP and the second BWP are controlled to execute the BWP switching command.

The case 1, in which the first BWP and the second BWP are controlled to execute the BWP switching command, includes the following two scenarios:

1.1. in a case where there is ongoing random access on the first BWP, the first BWP and the second BWP are controlled to execute the BWP switching command; and 1.2. in a case where there is no ongoing random access on the first BWP, the first BWP and the second BWP are controlled to execute the BWP switching command.

That is, in the case 1, regardless of whether there is the ongoing random access on the first BWP or not, when the BWP switching command is received, the first BWP is directly deactivated and the second BWP is directly activated.

In case 2, in a case where the second BWP is a BWP in URLLC, the first BWP and the second BWP are controlled to execute the BWP switching command.

The case 2, in which the first BWP and the second BWP are controlled to execute the BWP switching command in the case where the second BWP is the BWP in URLLC, includes the following two scenarios:

2.1. in a case where there is the ongoing random access on the first BWP and the second BWP is the BWP in URLLC, the first BWP and the second BWP are controlled to execute the BWP switching command; and 2.2. in a case where there is no ongoing random access on the first BWP and the second BWP is the BWP in URLLC, the first BWP and the second BWP are controlled to execute the BWP switching command.

In the case 2, the first BWP may be a BWP in the eMBB.

In case 3, in a case where there is a configuration grant for the second BWP and the configuration grant is configured with a modulation and coding scheme (MCS) table, the first BWP and the second BWP are controlled to execute the BWP switching command.

The case 3, in which the first BWP and the second BWP are controlled to execute the BWP switching command in the case where there is the configuration grant for the second BWP and the configuration grant is configured with the MCS table, includes the following two scenarios:

3.1. in a case where there is the ongoing random access on the first BWP, and there is the configuration grant for the second BWP and the configuration grant is configured with the MCS table, the first BWP and the second BWP are controlled to execute the BWP switching command; and 3.2. in a case where there is no ongoing random access on the first BWP, and there is the configuration grant for the second BWP and the configuration grant is configured with the MCS table, the first BWP and the second BWP are controlled to execute the BWP switching command.

In case 4, in a case where the BWP switching command carries a special radio network temporary identity (RNTI), the first BWP and the second BWP are controlled to execute the BWP switching command.

The special RNTI in some embodiments of the present disclosure may be a RNTI defined in a new radio (NR) system. That is, the special RNTI in some embodiments of the present disclosure may be a new RNTI.

The special RNTI is generally used to indicate a new MCS table, and the new MCS table is generally used in URLLC. Therefore, in a case where the BWP switching command carries a new RNTI, the BWP switching command is executed.

The case 4, in which the first BWP and the second BWP are controlled to execute the BWP switching command in the case where the BWP switching command carries the special RNTI, includes the following two scenarios:

4.1. in a case where there is the ongoing random access on the first BWP, and the BWP switching command carries the special RNTI, the first BWP and the second BWP are controlled to execute the BWP switching command; and 4.2. in a case where there is no ongoing random access on the first BWP, and the BWP switching command carries the special RNTI, the first BWP and the second BWP are controlled to execute the BWP switching command.

In case 5, in a case where the BWP switching command uses a special downlink control information (DCI) format, the first BWP and the second BWP are controlled to execute the BWP switching command.

In some examples, the special DCI format may be a DCI format in the NR system, or may be a DCI format obtained by extending an original DCI format.

Since the special DCI format is generally used to indicate the RNTI defined in the NR system, or the MCS table defined in the NR system, or high-priority traffic, when the BWP switching command uses the special DCI format, the BWP switching command is executed.

The case 5, in which the first BWP and the second BWP are controlled to execute the BWP switching command in the case where the BWP switching command uses the special DCI format, includes the following two scenarios:

5.1. in a case where there is the ongoing random access on the first BWP, and the BWP switching command uses the special DCI format, the first BWP and the second BWP are controlled to execute the BWP switching command; and 5.2. in a case where there is no ongoing random access on the first BWP, and the BWP switching command uses the special DCI format, the first BWP and the second BWP are controlled to execute the BWP switching command.

In case 6, in a case where the BWP switching command is sent to the terminal device through common search space (CSS), the first BWP and the second BWP are controlled to execute the BWP switching command.

The case 6, in which the first BWP and the second BWP are controlled to execute the BWP switching command in the case where the BWP switching command is sent to the terminal device though CSS, includes the following two scenarios:

6.1. in a case where there is the ongoing random access on the first BWP, and the BWP switching command is sent to the terminal device through CSS, the first BWP and the second BWP are controlled to execute the BWP switching command; and 6.2. in a case where there is no ongoing random access on the first BWP, and the BWP switching command is sent to the terminal device through CSS, the first BWP and the second BWP are controlled to execute the BWP switching command.

In case 7, in a case where the BWP switching command is sent to the terminal device through UE specific search space (USS), the first BWP and the second BWP are controlled to execute the BWP switching command.

The case 7, in which the first BWP and the second BWP are controlled to execute the BWP switching command in the case where the BWP switching command is sent to the terminal device through USS, includes the following two scenarios:

7.1. in a case where there is the ongoing random access on the first BWP, and the BWP switching command is sent to the terminal device through USS, the first BWP and the second BWP are controlled to execute the BWP switching command; and 7.2. in a case where there is no ongoing random access on the first BWP, and the BWP switching command is sent to the terminal device through USS, the first BWP and the second BWP are controlled to execute the BWP switching command.

It should be noted that, in order to ensure normal progress of the ongoing random access on the first BWP in 1.1, 2.1, 3.1, 4.1, 5.1, 6.1 and 7.1, after the first BWP and the second BWP are controlled to execute the BWP switching command in 1.1, 2.1, 3.1, 4.1, 5.1, 6.1 and 7.1, the BWP switching command processing method provided by some embodiment of the present disclosure further includes: initiating random access on the second BWP.

That is, in the case where there is the ongoing random access on the first BWP, after the first BWP and the second BWP are controlled to execute the BWP switching command, the BWP switching command processing method further includes:

initiating the random access on the second BWP.

After the first BWP is deactivated and the second BWP is activated, the random access is initiated on the second BWP. Thus, in the above embodiment, the random access may be normally performed.

In case 8, in the case where there is the ongoing random access on the first BWP, the first BWP and the second BWP are controlled to ignore the BWP switching command.

That is, in the case where there is the ongoing random access on the first BWP, if the BWP switching command for deactivating the first BWP and activating the second BWP is received, the BWP switching command is not executed for the first BWP and the second BWP (i.e., ignoring the BWP switching command).

In some examples, the BWP switching command is further used to instruct the terminal device to deactivate a third BWP and activate a fourth BWP. The third BWP is a BWP in the at least one configured or activated BWP and there is no ongoing random access on the third BWP. The fourth BWP is a BWP except the at least one configured or activated BWP. The BWP switching command processing method further includes:

controlling the third BWP and the fourth BWP to execute the BWP switching command.

For example, configured or activated BWPs of the terminal device include BWP1, BWP2 and BWP3, and the first command received by the terminal device includes the BWP switching command. The BWP switching command is used to instruct the terminal device to deactivate BWP1 and activate BWP4, and deactivate BWP2 and activate BWP5. There is ongoing random access on BWP1, and there is no ongoing random access on BWP2. In this case, according to the above method, the terminal device controls BWP1 and BWP4 to ignore the BWP switching command, and controls BWP2 and BWP5 to execute the BWP switching command.

In case 9, in a case where there is the ongoing random access on the first BWP and the second BWP is not configured with random access resources, the first BWP and the second BWP are controlled to ignore the BWP switching command.

In the above embodiments, in the case where it is determined that there is the ongoing random access on the first BWP and the second BWP is not configured with the associated random access resources, the first BWP and the second BWP are controlled to ignore the BWP switching command, so that the normal progress of the random access may be ensured.

In case 10, in a case where there is the ongoing random access on the first BWP and the second BWP shares hardware with any BWP, the first BWP and the second BWP are controlled to ignore the BWP switching command.

In some examples of the present disclosure, a shared hardware may include any possible hardware, such as an antenna, a baseband processing unit.

Figure 3:
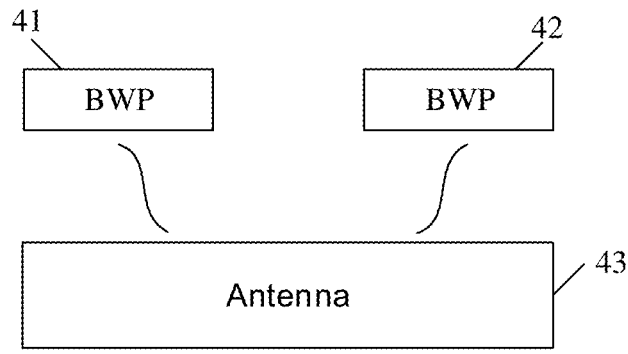
FIG. 3 is a schematic diagram showing a structure of shared hardware between BWPs, in accordance with some embodiments of the present disclosure.

For example, referring to FIG. 3, it is assumed that the second BWP is BWP 41, any BWP is BWP 42, and the BWP 41 and the BWP 42 share antenna 43 (i.e. there is shared hardware between the second BWP and any BWP), and there is ongoing random access in the first BWP; the terminal device may ignore the BWP switching command.

In some embodiments of the present disclosure, in the case where it is determined that there is the ongoing random access on the first BWP and the second BWP shares the hardware with any BWP, the first BWP and the second BWP are controlled to ignore the BWP switching command, so that the normal progress of the random access may be ensured.

In case 11, in a case where activating the second BWP causes channel transmission or reception on any BWP in the at least one configured or activated BWP to be interrupted, the first BWP and the second BWP are controlled to ignore the BWP switching command.

In the above embodiments, in the case where activating the second BWP causes the channel transmission or reception on any BWP in the at least one configured or activated BWP of the terminal device to be interrupted, the first BWP and the second BWP are controlled to ignore the BWP switching command, so that it is possible to prevent execution of the BWP switching command from affecting the at least one configured or activated BWP of the terminal device.

II. The first command includes the BWP activation command, and the BWP activation command is used to instruct the terminal device to activate the fifth BWP.

In a case where the first command includes the BWP activation command, S12, in which the first command is processed according to the preset processing manner, includes the following cases.

In case 1, the fifth BWP is controlled to execute the BWP activation command.

That is, if the BWP activation command is received, it is directly executed.

In case 2, in a case where the fifth BWP is a BWP in URLLC, the fifth BWP is controlled to execute the BWP activation command.

In case 3, in a case where there is a configuration grant for the fifth BWP and the configuration grant is configured with a MCS table, the fifth BWP is controlled to execute the BWP activation command.

In case 4, in a case where the BWP activation command carries a special RNTI, the fifth BWP is controlled to execute the BWP activation command.

The special RNTI may be a new RNTI defined in the NR system.

In case 5, in a case where the BWP activation command uses a special DCI format, the fifth BWP is controlled to execute the BWP activation command.

The special DCI format may be a new DCI format defined in the NR system, or may be a DCI format obtained by extending an original DCI format.

In case 6, in a case where the BWP activation command is sent to the terminal device through CSS, the fifth BWP is controlled to execute the BWP activation command.

In case 7, in a case where the BWP activation command is sent to the terminal device through USS, the fifth BWP is controlled to execute the BWP activation command.

In case 8, in a case where the fifth BWP shares hardware with any BWP, the fifth BWP is controlled to ignore the BWP activation command.

In the case where the fifth BWP shares the hardware with any BWP, by controlling the fifth BWP to ignore the BWP activation command, influence on the random access may be avoided.

In case 9, in a case where activating the fifth BWP causes channel transmission or reception on any BWP in the at least one configured or activated BWP to be interrupted, the fifth BWP is controlled to ignore the BWP activation command.

In the above embodiment, in the case where activating the fifth BWP causes the channel transmission or reception on any BWP in the at least one configured or activated BWP of the terminal device to be interrupted, the fifth BWP is controlled to ignore the BWP activation command, so that it is possible to prevent execution of the BWP activation command from affecting the at least one configured or activated BWP of the terminal device.

III. The first command includes the BWP deactivation command, and the BWP deactivation command is used to instruct the terminal device to deactivate the sixth BWP.

In a case where the first command includes the BWP deactivation command, S12, in which the first command is processed according to the preset processing manner, includes the following cases.

In case 1, in a case where there is ongoing random access on the sixth BWP, the sixth BWP is controlled to ignore the BWP deactivation command.

Since deactivating the sixth BWP affects the ongoing random access on the sixth BWP, by controlling the sixth BWP to ignore the BWP deactivation command, influence on the ongoing random access on the sixth BWP may be avoided.

In case 2, in a case where there is the ongoing random access on the sixth BWP and the sixth BWP is a BWP in URLLC, the sixth BWP is controlled to ignore the BWP deactivation command.

In case 3, in a case where the sixth BWP shares hardware with any BWP, the sixth BWP is controlled to ignore the BWP deactivation command.

In the case where the sixth BWP shares the hardware with any BWP, by controlling the sixth BWP to ignore the BWP deactivation command, influence on the random access may be avoided.

In case 4, in the case where there is the ongoing random access on the sixth BWP, the sixth BWP is controlled to execute the BWP deactivation command.

Controlling the sixth BWP to execute the BWP deactivation command affects the ongoing random access on the sixth BWP. Therefore, in order to avoid affecting the ongoing random access on the sixth BWP, in the case where there is the ongoing random access on the sixth BWP, and after the sixth BWP is controlled to execute the BWP deactivation command, the BWP switching command processing method provided by some embodiments of the present disclosure further includes: initiating random access on a seventh BWP.

The seventh BWP is a BWP in the at least one configured or activated BWP, and the seventh BWP is configured with random access resources.

That is, a BWP configured with random access resources is selected from the at least one configured or activated BWP of the terminal device, and random access is re-initiated on the BWP.

In case 5, in a case where the BWP deactivation command carries a special RNTI, the sixth BWP is controlled to execute the BWP deactivation command.

In case 6, in a case where the BWP deactivation command uses a special DCI format, the sixth BWP is controlled to execute the BWP deactivation command.

In case 7, in a case where the BWP deactivation command is sent to the terminal device through CSS, the sixth BWP is controlled to execute the BWP deactivation command.

In case 8, in a case where the BWP deactivation command is sent to the terminal device through USS, the sixth BWP is controlled to execute the BWP deactivation command.

In case 9, in a case where there is the ongoing random access on the sixth BWP and the sixth BWP is not the BWP in URLLC, the sixth BWP is controlled to execute the BWP deactivation command.

In the BWP switching command processing method provided by some embodiments of the present disclosure, in the case where there is at least one configured or activated BWP for the terminal device, and there is the ongoing random access on the at least one BWP in the at least one configured or activated BWP, at least one of the BWP switching command, the BWP activation command or the BWP deactivation command is received, and then the received at least one of the BWP switching command, the BWP activation command or the BWP deactivation command is processed according to the preset processing manner. Since some embodiments of the present disclosure provides the manner of processing the received at least one of the BWP switching command, the BWP activation command or the BWP deactivation command in the case where there is at least one configured or activated BWP for the terminal device, and there is the ongoing random access on the at least one BWP in the at least one configured or activated BWP, in some embodiments of the present disclosure, the received at least one of the BWP switching command, the BWP activation command or the BWP deactivation command may be processed in the case where there are one or more BWPs simultaneously activated for the terminal device, and there is the ongoing random access on the BWP(s) in the activated one or more BWPs.

Figure 4:
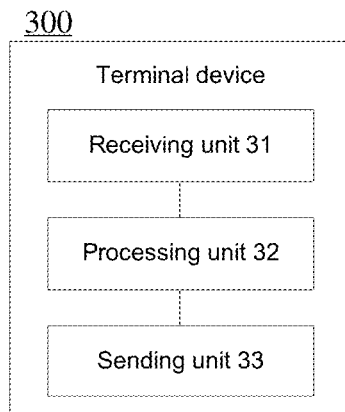
FIG. 4 is a schematic diagram showing a structure of a terminal device, in accordance with some embodiments of the present disclosure.

Some embodiments of the present disclosure provide a terminal device. As shown in FIG. 4, the terminal device 300 includes a receiving unit 31 and a processing unit 32.

The receiving unit 31 is used to receive the first command in the case where there is at least one configured or activated BWP for the terminal device, and there is the ongoing random access on the at least one BWP in the at least one configured or activated BWP. The first command includes at least one of the BWP switching command, the BWP activation command or the BWP deactivation command. The BWP switching command is used to instruct the terminal device to deactivate the first BWP and activate the second BWP, the BWP activation command is used to instruct the terminal device to activate the fifth BWP, and the BWP deactivation command is used to instruct the terminal device to deactivate the sixth BWP. The first BWP and the sixth BWP are the BWPs in the at least one configured or activated BWP, and the second BWP and the fifth BWP are the BWPs except the at least one configured or activated BWP. The processing unit 32 is used to process the first command received by the receiving unit 31 according to the preset processing manner.

In some examples, the preset processing manner is specified by the communication protocol, or is configured by the network side device for the terminal device, or is customized by the terminal device.

In some examples, the first command includes the BWP switching command. The processing unit 32 is specifically used to control the first BWP and the second BWP to execute the BWP switching command.

In some examples, the first command includes the BWP switching command. The processing unit 32 is specifically used to control the first BWP and the second BWP to execute the BWP switching command in the case where the second BWP is the BWP in URLLC, or there is the configuration grant for the second BWP and the configuration grant is configured with the MCS table, or the BWP switching command carries the special RNTI, or the BWP switching command uses the special DCI format, or the BWP switching command is sent to the terminal device through CSS, or the BWP switching command is sent to the terminal device through USS.

In some examples, in the case where there is the ongoing random access on the first BWP, the terminal device 300 further includes a sending unit 33. The sending unit 33 is used to initiate the random access on the second BWP after the processing unit 32 controls the first BWP and the second BWP to execute the BWP switching command.

In some examples, the first command includes the BWP switching command. The processing unit 32 is specifically used to control the first BWP and the second BWP to ignore the BWP switching command in the case where there is the ongoing random access on the first BWP.

In some examples, the BWP switching command is further used to instruct the terminal device to deactivate the third BWP and activate the fourth BWP. The third BWP is a BWP in the at least one configured or activated BWP and there is no ongoing random access on the third BWP, and the fourth BWP is a BWP except the at least one configured or activated BWP. The processing unit 32 is further used to control the third BWP and the fourth BWP to execute the BWP switching command.

In some examples, the first command includes the BWP switching command. The processing unit 32 is specifically used to control the first BWP and the second BWP to ignore the BWP switching command in the case where there is the ongoing random access on the first BWP and the second BWP is not configured with the random access resources, or there is the ongoing random access on the first BWP and the second BWP shares the hardware with any BWP, or activating the second BWP causes the channel transmission or reception on any BWP in the at least one configured or activated BWP to be interrupted.

In some examples, the first command includes the BWP activation command. The processing unit 32 is specifically used to control the fifth BWP to execute the BWP activation command.

In some examples, the first command includes the BWP activation command. The processing unit 32 is specifically used to control the fifth BWP to execute the BWP activation command in the case where the fifth BWP is the BWP in URLLC, or there is the configuration grant for the fifth BWP and the configuration grant is configured with the MCS table, or the BWP activation command carries the special RNTI, or the BWP activation command uses the special DCI format, or the BWP activation command is sent to the terminal device through CSS, or the BWP activation command is sent to the terminal device through USS.

In some examples, the first command includes the BWP activation command. The processing unit 32 is specifically used to control the fifth BWP to ignore the BWP activation command in the case where it is determined that the fifth BWP shares the hardware with any BWP, or activating the fifth BWP causes the channel transmission or reception on any BWP in the at least one configured or activated BWP to be interrupted.

In some examples, the first command includes the BWP deactivation command. The processing unit 32 is specifically used to control the sixth BWP to ignore the BWP deactivation command in the case where there is the ongoing random access on the sixth BWP, or there is the ongoing random access on the sixth BWP and the sixth BWP is the BWP in URLLC, or the sixth BWP shares the hardware with any BWP.

In some examples, the first command includes the BWP deactivation command. The processing unit 32 is specifically used to control the sixth BWP to execute the BWP deactivation command in the case where there is the ongoing random access on the sixth BWP.

In some examples, as shown in FIG. 4, the terminal device 300 further includes the sending unit 33. The sending unit 33 is used to initiate the random access on the seventh BWP after the processing unit 32 controls the sixth BWP to execute the BWP deactivation command. The seventh BWP is the BWP in the at least one configured or activated BWP, and the seventh BWP is configured with the random access resources.

In some examples, the first command includes the BWP deactivation command. The processing unit 32 is specifically used to control the sixth BWP to execute the BWP deactivation command in the case where there is the ongoing random access on the sixth BWP and the sixth BWP is not the BWP in URLLC, or the BWP deactivation command carries the special RNTI, or the BWP deactivation command uses the special DCI format, or the BWP deactivation command is sent to the terminal device through CSS, or the BWP deactivation command is sent to the terminal device through USS.

The terminal device provided by some embodiments of the present disclosure can implement each step performed by the terminal device in the above method embodiment. In order to avoid repetition, details will not be repeated herein.

As for the terminal device provided by some embodiments of the present disclosure, in the case where there is at least one configured or activated BWP for the terminal device, and there is the ongoing random access on the at least one BWP in the at least one configured or activated BWP, at least one of the BWP switching command, the BWP activation command or the BWP deactivation command is received, and then the received at least one of the BWP switching command, the BWP activation command or the BWP deactivation command is processed according to the preset processing manner. Since some embodiments of the present disclosure provides the manner of processing the received at least one of the BWP switching command, the BWP activation command or the BWP deactivation command in the case where there is at least one configured or activated BWP for the terminal device, and there is the ongoing random access on the at least one BWP in the at least one configured or activated BWP, in some embodiments of the present disclosure, the received at least one of the BWP switching command, the BWP activation command or the BWP deactivation command may be processed in the case where there are one or more BWPs simultaneously activated for the terminal device, and there is the ongoing random access on the BWP(s) in the activated one or more BWPs.

Figure 5:
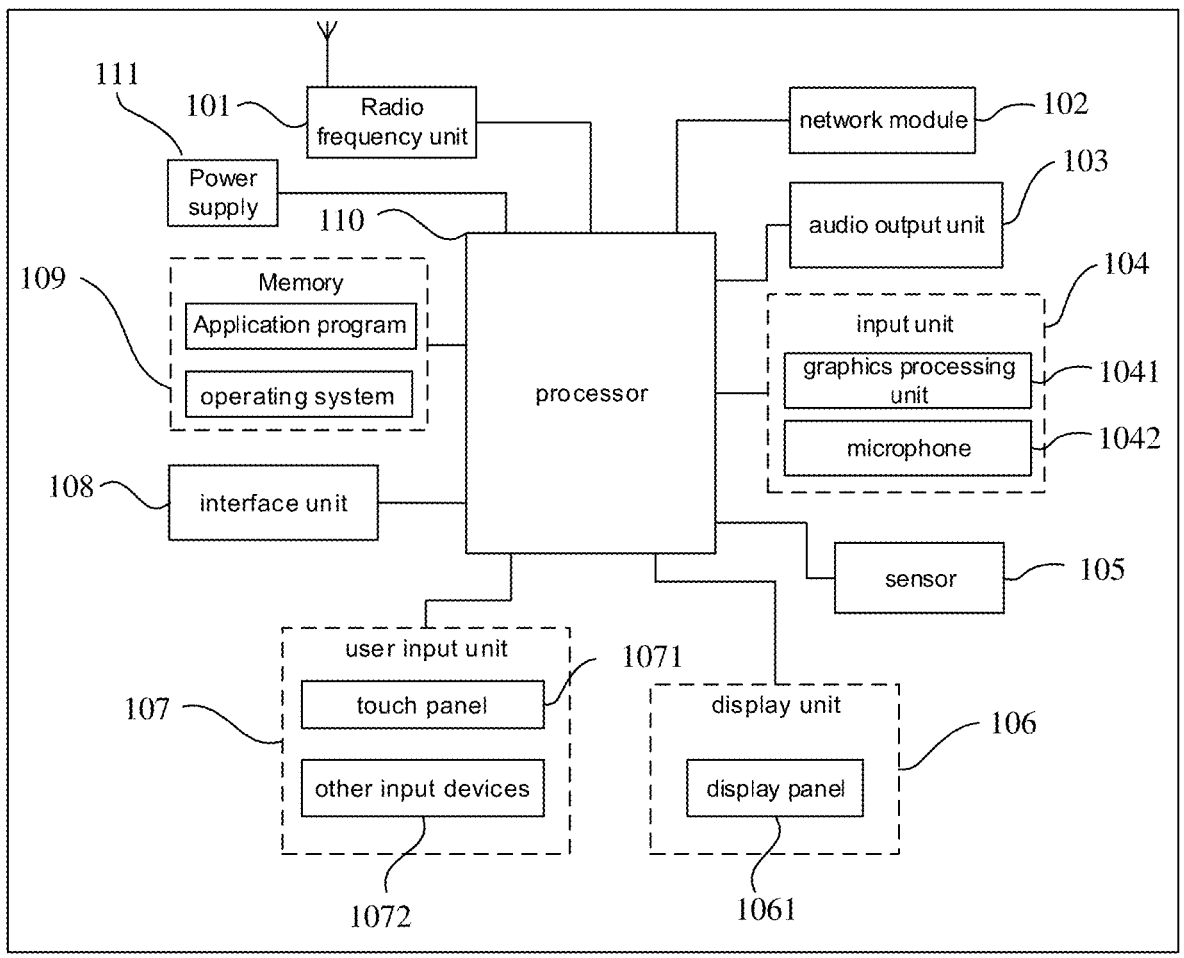
FIG. 5 is a schematic diagram showing a hardware structure of a terminal device, in accordance with some embodiments of the present disclosure.

FIG. 5 is a schematic diagram showing a hardware structure of a terminal device for implementing some embodiments of the present disclosure. The terminal device includes, but is not limited to, a radio frequency unit 101, a network module 102, an audio output unit 103, an input unit 104, a sensor 105, a display unit 106, a user input unit 107, an interface unit 108, a memory 109, a processor 110, and a power supply 111. A person skilled in the art will understand that, the structure of the terminal device shown in FIG. 5 does not constitute limitation on the terminal device, and the terminal device may include more or fewer components than shown, or a combination of certain components, or components with different arrangements. In some embodiments of the present disclosure, the terminal devices include, but are not limited to, a mobile phone, a tablet computer, a notebook computer, a palmtop computer, a vehicle-mounted terminal, a wearable device, and a pedometer.

In some examples, the radio frequency unit 101 is configured to receive the first command in the case where there is at least one configured or activated BWP for the terminal device, and there is the ongoing random access on the at least one BWP in the at least one configured or activated BWP. The first command includes at least one of the BWP switching command, the BWP activation command or the BWP deactivation command. The BWP switching command is used to instruct the terminal device to deactivate the first BWP and activate the second BWP, the BWP activation command is used to instruct the terminal device to activate the fifth BWP, and the BWP deactivation command is used to instruct the terminal device to deactivate the sixth BWP. The first BWP and the sixth BWP are the BWPs in the at least one configured or activated BWP, and the second BWP and the fifth BWP are the BWPs except the at least one configured or activated BWP; The processor 110 is configured to process the first command received by the radio frequency unit 101 according to the preset processing manner.

In some examples, the preset processing manner is specified by the communication protocol, or is configured by the network side device for the terminal device, or is customized by the terminal device.

In some examples, the first command includes the BWP switching command. The processor 110 is configured to control the first BWP and the second BWP to execute the BWP switching command.

In some examples, the first command includes the BWP switching command. The processor 110 is configured to control the first BWP and the second BWP to execute the BWP switching command in the case where the second BWP is the BWP in URLLC, or there is the configuration grant for the second BWP and the configuration grant is configured with the MCS table, or the BWP switching command carries the special RNTI, or the BWP switching command uses the special DCI format, or the BWP switching command is sent to the terminal device through CSS, or the BWP switching command is sent to the terminal device through USS.

In some examples, in the case where there is the ongoing random access on the first BWP, the radio frequency unit 101 is further configured to initiate the random access on the second BWP after the processor 110 controls the first BWP and the second BWP to execute the BWP switching command.

In some examples, the first command includes the BWP switching command. The processor 110 is configured to control the first BWP and the second BWP to ignore the BWP switching command in the case where there is the ongoing random access on the first BWP.

In some examples, the BWP switching command is further used to instruct the terminal device to deactivate the third BWP and activate the fourth BWP. The third BWP is a BWP in the at least one configured or activated BWP and there is no ongoing random access on the third BWP, and the fourth BWP is a BWP except the at least one configured or activated BWP. The processor 110 is further configured to control the third BWP and the fourth BWP to execute the BWP switching command.

In some examples, the first command includes the BWP switching command. The processor 110 is configured to control the first BWP and the second BWP to ignore the BWP switching command in the case where there is the ongoing random access on the first BWP and the second BWP is not configured with the random access resources, or there is the ongoing random access on the first BWP and the second BWP shares the hardware with any BWP, or activating the second BWP causes the channel transmission or reception on any BWP in the at least one configured or activated BWP to be interrupted.

In some examples, the first command includes the BWP activation command. The processor 110 is configured to control the fifth BWP to execute the BWP activation command.

In some examples, the first command includes the BWP activation command. The processor 110 is configured to control the fifth BWP to execute the BWP activation command in the case where the fifth BWP is the BWP in URLLC, or there is the configuration grant for the fifth BWP and the configuration grant is configured with the MCS table, or the BWP activation command carries the special RNTI, or the BWP activation command uses the special DCI format, or the BWP activation command is sent to the terminal device through CSS, or the BWP activation command is sent to the terminal device through USS.

In some examples, the first command includes the BWP activation command. The processor 110 is configured to control the fifth BWP to ignore the BWP activation command in the case where it is determined that the fifth BWP shares the hardware with any BWP, or activating the fifth BWP causes the channel transmission or reception on any BWP in the at least one configured or activated BWP to be interrupted.

In some examples, the first command includes the BWP deactivation command. The processor 110 is configured to control the sixth BWP to ignore the BWP deactivation command in the case where there is the ongoing random access on the sixth BWP, or there is the ongoing random access on the sixth BWP and the sixth BWP is the BWP in URLLC, or the sixth BWP shares the hardware with any BWP.

In some examples, the first command includes the BWP deactivation command. The processor 110 is configured to control the sixth BWP to execute the BWP deactivation command in the case where there is the ongoing random access on the sixth BWP.

In some examples, the radio frequency unit 101 is further configured to initiate the random access on the seventh BWP after the processor 110 controls the sixth BWP to execute the BWP deactivation command. The seventh BWP is the BWP in the at least one configured or activated BWP, and the seventh BWP is configured with the random access resources.

In some examples, the first command includes the BWP deactivation command. The processor 110 is configured to control the sixth BWP to execute the BWP deactivation command in the case where there is the ongoing random access on the sixth BWP and the sixth BWP is not the BWP in URLLC, or the BWP deactivation command carries the special RNTI, or the BWP deactivation command uses the special DCI format, or the BWP deactivation command is sent to the terminal device through CSS, or the BWP deactivation command is sent to the terminal device through USS.

As for the terminal device provided by some embodiments of the present disclosure, in the case where there is at least one configured or activated BWP for the terminal device, and there is the ongoing random access on the at least one BWP in the at least one configured or activated BWP, at least one of the BWP switching command, the BWP activation command or the BWP deactivation command is received, and then the received at least one of the BWP switching command, the BWP activation command or the BWP deactivation command is processed according to the preset processing manner. Since some embodiments of the present disclosure provides the manner of processing the received at least one of the BWP switching command, the BWP activation command or the BWP deactivation command in the case where there is at least one configured or activated BWP for the terminal device, and there is the ongoing random access on the at least one BWP in the at least one configured or activated BWP, in some embodiments of the present disclosure, the received at least one of the BWP switching command, the BWP activation command or the BWP deactivation command may be processed in the case where there are one or more BWPs simultaneously activated for the terminal device, and there is the ongoing random access on the BWP(s) in the activated one or more BWPs.

It will be understood that, in some embodiments of the present disclosure, the radio frequency unit 101 may be used to receive and transmit signals in a process of receiving and sending information or during a call. The radio frequency unit 101 receives downlink data from a base station, and sends the downlink data to the processor 110 for processing. In addition, the radio frequency unit 101 sends uplink data to the base station. Generally, the radio frequency unit 101 includes, but is not limited to, an antenna, at least one amplifier, a transceiver, a coupler, a low noise amplifier, and a duplexer. In addition, the radio frequency unit 101 may further communicate with the network and other devices through a wireless communication system.

The terminal device provides wireless broadband Internet access to the user through the network module 102, such as helping the user to send and receive emails, browse web pages, and access streaming media.

The audio output unit 103 may convert audio data received by the radio frequency unit 101 or the network module 102 or stored in the memory 109 into audio signals and output the audio signals as sound. Moreover, the audio output unit 103 may further provide audio output associated with a specific function performed by the terminal device (e.g., call signal reception sound and message reception sound). The audio output unit 103 includes a speaker, a buzzer, a receiver, etc.

The input unit 104 is used to receive audio signals or video signals. The input unit 104 may include a graphics processing unit (GPU) 1041 and a microphone 1042. The GPU 1041 processes image data of still pictures or videos obtained by an image capture device (e.g., a camera) in a video capture mode or an image capture mode. A processed image frame may be displayed on the display unit 106. The image frame processed by the GPU 1041 may be stored in the memory 109 (or other storage medium) or sent via the radio frequency unit 101 or the network module 102. The microphone 1042 may receive sound, and may process the sound into audio data. The audio data obtained after processing may be converted into a format that may be sent to a mobile communication base station via the radio frequency unit 101 for output in a case of a telephone call mode.

The terminal device further includes at least one type of sensor 105, such as a light sensor, a motion sensor, and other sensors. The light sensor includes an ambient light sensor and a proximity sensor. The ambient light sensor may adjust brightness of a display panel 1061 according to brightness of the ambient light. The proximity sensor may turn off the display panel 1061 and/or backlight when the terminal device is moved to an ear. As a type of the motion sensor, an accelerometer sensor may detect a magnitude of acceleration in a plurality of directions (usually three axes), and may detect a magnitude and a direction of gravity when the accelerometer sensor is static, and may be used to identify postures of the terminal device (e.g., horizontal-vertical screen switching, related games, and magnetometer posture calibration), and identify related functions (e.g., pedometer and knocking) through vibration. The sensor 105 may further include a fingerprint sensor, a pressure sensor, an iris sensor, a molecular sensor, a gyroscope, a barometer, a hygrometer, a thermometer and an infrared sensor, which will not be described in detail herein.

The display unit 106 is used to display information input by the user or information provided to the user. The display unit 106 may include the display panel 1061, which may be configured in a form of a liquid crystal display (LCD), an organic light-emitting diode (OLED), or the like.

The user input unit 107 may be used to receive input digital or character information and generate key signal input related to user settings and function control of the terminal device. The user input unit 107 includes a touch panel 1071 and other input devices 1072. The touch panel 1071, also referred to as a touch screen, may collect touch operation by the user on or near the touch panel 1071 (e.g., operation by the user on or near the touch panel 1071 by using any suitable object or attachment such as a finger and a stylus). The touch panel 1071 may include two portions, i.e., a touch detection device and a touch controller. The touch detection device detects a position touched by the user, detects a signal brought by the touch operation and transmits the signal to the touch controller. The touch controller receives touch information from the touch detection device, converts the touch information into coordinates of a touch point, sends the coordinates of the touch point to the processor 110, receives a command from the processor 110, and executes the command. In addition, the touch panel 1071 may be achieved by using various types of touch panels such as a resistive touch panel, a capacitive touch panel, an infrared touch panel, and a surface acoustic wave touch panel. In addition to the touch panel 1071, the user input unit 107 may further include the other input devices 1072. The other input devices 1072 may include, but are not limited to, a physical keyboard, function keys (e.g., volume control keys and a on/off key), a trackball, a mouse, a joystick, which will not be described in detail herein.

Further, the touch panel 1071 may cover the display panel 1061. The touch panel 1071 sends the touch operation on or near it to the processor 110 after detecting the touch operation on or near it, so as to determine a type of the touch event. Then, the processor 110 provides corresponding visual output on the display panel 1061 according to the type of the touch event. Although in FIG. 5, the touch panel 1071 and the display panel 1061 are used as two separate components to implement an input function and an output function of the terminal device, in some embodiments, the touch panel 1071 may be integrated with the display panel 1061 to implement the input function and the output function of the terminal device, which is not specifically limited herein.

The interface unit 108 is an interface for connecting an external device and the terminal device. For example, the external devices may include a wired or wireless headset port, an external power supply (or battery charger) port, a wired or wireless data port, a memory card port, a port for connecting a device with an identification module, an audio input/output (I/O) port, a video I/O port, and an earphone port. The interface unit 108 may be used to receive input from the external device (e.g., data information and power) and transmit the received input to one or more elements in the terminal device, or may be used to transmit data between the terminal device and the external device.

The memory 109 may be used to store software programs and various data. The memory 109 may mainly include a program storage region and a data storage region. The program storage region may store an operating system, and an application program required by at least one function (e.g., a sound playing function or an image playing function). The data storage region may store data (e.g., audio data and a phone book) created according to use of a mobile phone. In addition, the memory 109 may include a high-speed random access memory, and may further include a non-volatile memory, such as at least one magnetic disk storage device, a flash memory device, or other non-volatile solid-state storage devices.

The processor 110 is a control center of the terminal device. The processor 110 is connected to a plurality of parts of an entire terminal device through various interfaces and wirings, and performs various functions of the terminal device and processes data by running or executing software programs and/or modules stored in the memory 109 and invoking data stored in the memory 109, thereby monitoring the terminal device as a whole. The processor 110 may include one or more processing units. An application processor and a modem processor may be integrated in the processor 110. The application processor mainly processes the operating system, a user interface and application programs, and the modem processor mainly processes wireless communication. It will be understood that, the modem processor may not be integrated in the processor 110.

The terminal device may further include the power supply 111 (e.g., a battery) for supplying power to a plurality of components. The power supply 111 may be logically connected to the processor 110 through a power management system, so that functions such as charging management, discharging management, and power consumption management are achieved through the power management system.

In addition, the terminal device includes some functional modules that are not shown, which will not be described in details herein.

Some embodiments of the present disclosure further provide a non-transitory computer-readable storage medium. The non-transitory computer-readable storage medium stores computer programs that, when executed by a processor, cause the processor to perform a plurality of processes of the BWP switching command processing method described in the above embodiment, which can achieve same technical effects. In order to avoid repetition, details will not be repeated herein. The non-transitory computer-readable storage medium may be, for example, a read-only memory (abbreviated as ROM), a random access memory (abbreviated as RAM), a magnetic disk, or an optical disk.

It will be noted that, the terms such as "comprise", "include" and "configured to" or any other variants thereof herein are intended to cover non-exclusive inclusion, so that a process, a method, an article or a device that includes a series of elements not only includes those elements, but also includes other elements not explicitly listed, or includes elements inherent to the process, the method, the article or the device. In a case where there is no more limitation, an element defined by the phrase "including a . . . " does not exclude existence of other identical elements in a process, a method, an article or a device that includes the element.

Through the description of the above embodiments, a person skilled in the art will clearly understand that, the method in the above embodiment may be performed by means of software plus a necessary general-purpose hardware platform. Of course, the method may further be performed through hardware, but in many cases, the former is a better implementation. On a basis of such understanding, the technical solution in the application essentially or a part contributing to the prior art may be embodied in a form of a software product. The computer software product is stored in a storage medium (e.g., a ROM/RAM, a diskette, or an optical disk), and includes some instructions for causing a terminal (which may be a mobile phone, a computer, a server, an air conditioner, or a network side device) to perform the method described in a plurality of embodiments of the application.

The embodiments of the application are described above with reference to the accompanying drawings. However, the application is not limited to the above specific embodiments. The above specific embodiments are merely examples and are not restrictive. Under enlightenment of the application, a person of ordinary skill in the art may make a plurality of forms without departing from spirit of the application and the protection scope of the claims, all of which fall on the protection scope of the application.

What is claimed is:

1. A bandwidth part (BWP) switching command processing method, performed by a terminal device, the BWP switching command processing method comprising:
receiving a first command in a case where there is at least one configured or activated BWP for the terminal device, and there is ongoing random access on at least one BWP in the at least one configured or activated BWP, the first command including a BWP switching command, the BWP switching command being used to instruct the terminal device to deactivate a first BWP and activate a second BWP, the first BWP being a BWP in the at least one configured or activated BWP, and the second BWP being a BWP except the at least one configured or activated BWP; and
processing the first command according to a preset processing manner;
wherein processing the first command according to the preset processing manner includes:
controlling the first BWP and the second BWP to ignore the BWP switching command in a case where there is the ongoing random access on the first BWP;
wherein the BWP switching command is further used to instruct the terminal device to deactivate a third BWP and activate a fourth BWP, the third BWP is a BWP on which there is no ongoing random access in the at least one configured or activated BWP, the fourth BWP is a BWP except the at least one configured or activated BWP, and the fourth BWP and the second BWP are a same BWP or different BWPs; and the BWP switching command processing method further comprises:
controlling the third BWP and the fourth BWP to execute the BWP switching command.

2. The BWP switching command processing method according to claim 1, wherein the preset processing manner is specified by a communication protocol, or is configured by a network side device for the terminal device, or is customized by the terminal device.

3. The BWP switching command processing method according to claim 1, wherein processing the first command according to the preset processing manner further includes:

controlling the first BWP and the second BWP to execute the BWP switching command.

4. The BWP switching command processing method according to claim 3, wherein in a case where there is ongoing random access on the first BWP, after the first BWP and the second BWP are controlled to execute the BWP switching command, the BWP switching command processing method further comprises:
initiating random access on the second BWP.

5. The BWP switching command processing method according to claim 1, wherein processing the first command according to the preset processing manner further includes:
controlling the first BWP and the second BWP to execute the BWP switching command in a case where the second BWP is a BWP in ultra-reliable and low-latency communication (URLLC), or there is a configuration grant for the second BWP and the configuration grant is configured with a modulation and coding scheme (MCS) table, or the BWP switching command carries a special radio network temporary identity (RNTI), or the BWP switching command uses a special downlink control information (DCI) format, or the BWP switching command is sent to the terminal device through common search space (CSS), or the BWP switching command is sent to the terminal device through user equipment specific search space (USS);
wherein the special RNTI is a RNTI defined in a new radio (NR) system, and the special DCI format is a DCI format in the NR system, or a DCI format obtained by extending an original DCI format.

6. The BWP switching command processing method according to claim 1,
wherein processing the first command according to the preset processing manner further includes:
controlling the first BWP and the second BWP to ignore the BWP switching command in a case where the second BWP shares hardware with any BWP,
wherein the shared hardware includes an antenna or a baseband processing unit.

7. A terminal device, comprising:
a radio frequency unit configured to receive a first command in a case where there is at least one configured or activated bandwidth part (BWP) for the terminal device, and there is ongoing random access on at least one BWP in the at least one configured or activated BWP, the first command including a BWP switching command, the BWP switching command being used to instruct the terminal device to deactivate a first BWP and activate a second BWP, the first BWP being a BWP in the at least one configured or activated BWP, and the second BWP being a BWP except the at least one configured or activated BWP; and
a processor configured to process the first command according to a preset processing manner;
wherein the processor is configured to control the first BWP and the second BWP to ignore the BWP switching command in a case where there is the ongoing random access on the first BWP;
wherein the BWP switching command is further used to instruct the terminal device to deactivate a third BWP and activate a fourth BWP, the third BWP is a BWP on which there is no ongoing random access in the at least one configured or activated BWP, the fourth BWP is a BWP except the at least one configured or activated BWP, and the fourth BWP and the second BWP are a same BWP or different BWPs; and the processor is further configured to control the third BWP and the fourth BWP to execute the BWP switching command.

8. The terminal device according to claim 7, wherein the processor is further configured to control the first BWP and the second BWP to execute the BWP switching command in a case where the second BWP is a BWP in ultra-reliable and low-latency communication (URLLC), or there is a configuration grant for the second BWP and the configuration grant is configured with a modulation and coding scheme (MCS) table, or the BWP switching command carries a special radio network temporary identity (RNTI), or the BWP switching command uses a special downlink control information (DCI) format, or the BWP switching command is sent to the terminal device through common search space (CSS), or the BWP switching command is sent to the terminal device through user equipment specific search space (USS);
wherein the special RNTI is a RNTI defined in a new radio (NR) system, and the special DCI format is a DCI format in the NR system, or a DCI format obtained by extending an original DCI format.

9. The terminal device according to claim 7, wherein the preset processing manner is specified by a communication protocol, or is configured by a network side device for the terminal device, or is customized by the terminal device.

10. The terminal device according to claim 7, wherein the processor is further configured to control the first BWP and the second BWP to execute the BWP switching command.

11. The terminal device according to claim 10, wherein the radio frequency unit is further configured to initiate random access on the second BWP in a case where there is ongoing random access on the first BWP.

12. The terminal device according to claim 7, wherein the computer programs, wherein the processor is further configured to control the first BWP and the second BWP to ignore the BWP switching command in a case where the second BWP shares hardware with any BWP,
wherein the shared hardware includes an antenna or a baseband processing unit.

13. A non-transitory computer-readable storage medium, wherein the non-transitory computer-readable storage medium stores computer programs, and the computer programs, when executed by a processor of a terminal device, cause the terminal device to perform:
receiving a first command in a case where there is at least one configured or activated bandwidth part (BWP) for the terminal device, and there is ongoing random access on at least one BWP in the at least one configured or activated BWP, the first command including a BWP switching command, the BWP switching command being used to instruct the terminal device to deactivate a first BWP and activate a second BWP, the first BWP being a BWP in the at least one configured or activated BWP, and the second BWP being a BWP except the at least one configured or activated BWP; and
processing the first command according to a preset processing manner;
wherein the computer programs, when executed by the processor, cause the terminal device to perform:
controlling the first BWP and the second BWP to ignore the BWP switching command in a case where there is the ongoing random access on the first BWP;
wherein the shared hardware includes an antenna or a baseband processing unit wherein the BWP switching command is further used to instruct the terminal device to deactivate a third BWP and activate a fourth BWP, the third BWP is a BWP on which there is no ongoing random access in the at least one configured or activated BWP, the fourth BWP is a BWP except the at least one configured or activated BWP, and the fourth BWP and the second BWP are a same BWP or different BWPs; and the computer programs, when executed by the processor, cause the terminal device to further perform:

controlling the third BWP and the fourth BWP to execute the BWP switching command.

14. The non-transitory computer-readable storage medium according to claim 13, wherein the computer programs, when executed by the processor, cause the terminal device to further perform:

controlling the first BWP and the second BWP to execute the BWP switching command in a case where the second BWP is a BWP in ultra-reliable and low-latency communication (URLLC), or there is a configuration grant for the second BWP and the configuration grant is configured with a modulation and coding scheme (MCS) table, or the BWP switching command carries a special radio network temporary identity (RNTI), or the BWP switching command uses a special downlink control information (DCI) format, or the BWP switching command is sent to the terminal device through common search space (CSS), or the BWP switching command is sent to the terminal device through user equipment specific search space (USS);

wherein the special RNTI is a RNTI defined in a new radio (NR) system, and the special DCI format is a DCI format in the NR system, or a DCI format obtained by extending an original DCI format.

15. The non-transitory computer-readable storage medium according to claim 13, wherein the preset processing manner is specified by a communication protocol, or is configured by a network side device for the terminal device, or is customized by the terminal device.

16. The non-transitory computer-readable storage medium according to claim 13, wherein the computer programs, when executed by the processor, cause the terminal device to further perform:

controlling the first BWP and the second BWP to execute the BWP switching command.

17. The non-transitory computer-readable storage medium according to claim 13, wherein in a case where there is ongoing random access on the first BWP, the computer programs, when executed by the processor, cause the terminal device to further perform:

initiating random access on the second BWP.

18. The non-transitory computer-readable storage medium according to claim 13, wherein the computer programs, when executed by the processor, cause the terminal device to further perform:

controlling the first BWP and the second BWP to ignore the BWP switching command in a case where the second BWP shares hardware with any BWP, wherein the shared hardware includes an antenna or a baseband processing unit.

* * * * *